(12) United States Patent
Breivik et al.

(10) Patent No.: US 8,186,442 B2
(45) Date of Patent: May 29, 2012

(54) SYSTEM, VESSEL AND METHOD FOR PRODUCTION OF OIL AND HEAVIER GAS FRACTIONS FROM A RESERVOIR BELOW THE SEABED

(75) Inventors: Kåre Breivik, Tau (NO); Petter Gundersen, Stavanger (NO)

(73) Assignee: Compressed Energy Technology AS, Sandvika (NO)

( * ) Notice: Subject to any disclaimer, the term of this patent is extended or adjusted under 35 U.S.C. 154(b) by 556 days.

(21) Appl. No.: 12/307,715

(22) PCT Filed: Jul. 5, 2007

(86) PCT No.: PCT/NO2007/000260
§ 371 (c)(1),
(2), (4) Date: Mar. 26, 2009

(87) PCT Pub. No.: WO2008/010723
PCT Pub. Date: Jan. 24, 2008

(65) Prior Publication Data
US 2009/0321080 A1    Dec. 31, 2009

(30) Foreign Application Priority Data
Jul. 6, 2006    (NO) .................................... 20063140

(51) Int. Cl.
*E21B 43/00* (2006.01)
*E21B 43/01* (2006.01)
(52) U.S. Cl. ..................... 166/345; 166/369; 166/352
(58) Field of Classification Search ............. 166/345, 166/369, 352, 357; 114/74 R; 137/236.1
See application file for complete search history.

(56) References Cited

U.S. PATENT DOCUMENTS

| | | | |
|---|---|---|---|
| 3,830,180 A | 8/1974 | Bolton | |
| 4,446,804 A | 5/1984 | Kristiansen et al. | |
| 6,012,530 A | 1/2000 | Korsgaard | |
| 6,019,174 A | 2/2000 | Korsgaard | |
| 6,230,809 B1 | 5/2001 | Korsgaard | |
| 6,339,996 B1 | 1/2002 | Campbell | |
| 2005/0145388 A1* | 7/2005 | Hopper | ......................... 166/357 |

FOREIGN PATENT DOCUMENTS

| | | |
|---|---|---|
| NO | 320013 B1 | 10/2005 |
| WO | WO-82/00186 A1 | 1/1982 |

* cited by examiner

*Primary Examiner* — Thomas Beach
*Assistant Examiner* — James Sayre
(74) *Attorney, Agent, or Firm* — Birch, Stewart, Kolasch & Birch, LLP

(57) ABSTRACT

A system for production of oil and heavier gas fractions from a reservoir under a seabed includes a field installation with at least one production well and one injection well, a vessel with means to be connected to a loading and unloading station, and a receival plant configured to load and unload the vessel. The vessel includes a high-pressure three-phase separator, an injection compressor, and either water cleaning equipment or water injection equipment that the vessel can load high-pressure well fluid that is brought into the separator and separated to lighter gas fractions, oil and heavier gas fractions, and water, of which oil and heavier gas fractions are brought to high-pressure storage tanks in the vessel, which high-pressure storage tanks include high-pressure gas which thereby is displaced out of the tanks and injected into the reservoir together with the lighter gas fractions, via the injection compressor.

33 Claims, 3 Drawing Sheets

SYSTEM, VESSEL AND METHOD FOR PRODUCTION OF OIL AND HEAVIER GAS FRACTIONS FROM A RESERVOIR BELOW THE SEABED

FIELD OF THE INVENTION

The present invention relates to a system, a vessel and a method for production of oil and heavier gas fractions from a reservoir below the seabed. The system, vessel and method according to the invention are particularly feasible for production from marginal fields, in particular fields having low well pressure and risk of hydrate formation.

BACKGROUND OF THE INVENTION AND PRIOR ART

Significant oil and gas resources are at present stored in smaller fields that are not economically feasible to produce. Such fields, in general, termed marginal fields, can give at typical potential production of 10,000 to 40,000 barrels of oil equivalents per day. For some marginal fields the well pressure is below 100 barg, which makes production with existing equipment non-profitable. Further, there is an increasing demand to be able to produce oil and gas in a more environmentally friendly way, which means both reduced emissions to the surroundings and lower demand for power and equipment for the production. Several marginal fields, in particular from depleted reservoirs and sources of high water cut, will by production cause significant danger of hydrate formation, which increases the costs for production significantly.

In patent publication U.S. Pat. No. 6,339,996 B1 a vessel is described, having storage tanks of composite for compressed natural gas. Weight saving for composite tanks, relative to comparable steel tanks, is up to 70%. The tanks according to said patent publication are vertically aligned, and out of consideration for stability a comprehensive pipe system to distribute the load is required. The loading and unloading procedure results in pressure relief of gas that could be found in the tanks or be formed in the tanks, and subsequent recompressing of the gas.

In patent publications U.S. Pat. No. 6,230,809 B1 and U.S. Pat. No. 6,019,174 a vessel is described that can load unprocessed well stream directly into storage tanks. The vessels are without equipment for processing, but it is mentioned that the lighter fractions can be used on board the vessel for energy production. In connection with loading nothing is described about simultaneous unloading of high-pressure gas that could be found in the storage tanks beforehand.

In patent publication U.S. Pat. No. 4,446,804 a method is described for transport of oil and gas under heavy pressure in tanks onboard a vessel. Water under pressure or some other feasible liquid, in a tank or group of tanks to be loaded, is displaced by the load to a new tank or group of tanks. Filling and emptying thereby take place under pressure by use of displacement, so that the pressure relief of the load is avoided. Thereby, significant pressure loss over the control valve in the tank is avoided, which pressure loss typical can be about 100 bar. Thereby evaporation of the load and poor tank utilization, severe cooling and formation of ice and hydrates, in addition to flow velocities up to the speed of sound, with resulting stresses of the tank assembly, are avoided. Nothing is mentioned about having high-pressure load in the tanks beforehand, for unloading and injection thereof together with optional fractions separated out from the load, simultaneously with loading.

In patent publication U.S. Pat. No. 3,830,180, vertically standing tanks for cryogenic fluids are described, arranged in a vessel, around which tanks insulation is provided with a convection barrier. Cooling of the hull is thereby avoided.

In patent publication NO 320013 a system for production of unstable multiphase fluid from a subsea source is described, with simultaneous injection of water and $CO_2$ to the subsea source for pressure support. More specifically, the system comprises:

A seabed-located sub-sea installation having
at least one well for receival of well stream,
at least one water separator for separation of water from the well stream,
at least one injection pump for injection of the separated water through
at least one water injection well,
at least one riser for transport of multiphase fluid to
at least one loading/unloading station where a vessel can lay anchored and load/unload
connection for power and signals from the vessel to the sub-sea installation
at least one riser for transport of $CO_2$ from a vessel to
at least one wellhead for injection of $CO_2$ delivered from
at least one vessel which at the above-mentioned station can unload $CO_2$ and simultaneously load multiphase fluid for transport to
a receival plant that can receive unstable multiphase fluid for utilization thereof, and from which $CO_2$ can be delivered for transfer to the vessel for transport and subsequent injection into the underground source.

For continuous operation of the system according to NO 320013 preferably two vessels, of which each vessel preferably has tanks coupled in series, are used, in such a way that when multiphase fluid is loaded, $CO_2$ will be displaced and thereby unloaded, optionally by means of a compressor in order to ensure sufficient pressure for injection into the underground source. At the interface between load and $CO_2$ preferably a plug following the fluid flow is used, and plug sluices are arranged at the end of the serial connection. The tanks of the vessel in the above-mentioned system are constructed of coiled tubing of reinforced polymer material. In the above publication there is no description of loading and unloading by displacement in both ends of the load travel of the vessel, no description of storage tanks on vessels so that natural separation takes place in the tanks, are described, the system is not applicable to marginal fields with low well pressure, specific measures against hydrate formation are not described, and situations exist when significant burning of gas will have to take place because of safety considerations.

There is a demand for a system, a method and vessel for production of oil and heavier gas fractions that are advantageous in relation to the above-mentioned problems.

SUMMARY OF THE INVENTION

The above-mentioned demand is met by providing a system for production of oil and heavier gas fraction from a reservoir under the seabed, comprising a field installation with at least one production well and one injection well, said at least one production well and one injection well being connected with risers to a loading and unloading station, a vessel configured to be connected to the loading and unloading station, a receival plant configured to load and unload the vessel, wherein the vessel comprises a high-pressure three-phase separator, an injection compressor, and either water cleaning equipment or water injection equipment, and the receival plant comprises a high-pressure loading and unloading mechanism, so that the vessel as connected to the field installation can load high pressure well fluid that is brought into the high-pressure three-phase separator and separated to lighter gas fractions, oil and heavier gas fractions, and water, of which oil and heavier gas fractions are configured to be brought to high-pressure storage tanks in the vessel, said high-pressured storage tanks containing high-pressure gas that thereby is displaced out of the high-pressure storage tanks and injected into the reservoir together with the lighter gas fractions, via the injection compressor, after which oil and heavier gas fractions after transport to the receival plant are configured to be unloaded by displacing the tank contents with high-pressure gas delivered from the receival plant. According to the present invention, there is further provided a method for production of oil and heavier gas fractions from a reservoir under the seabed, by use of the above-mentioned system, and a vessel particularly feasible for working the above-mentioned method.

FIGURES BRIEF DESCRIPTION OF THE DRAWINGS

The invention is illustrated with 3 figures, of which:

FIG. 2A is a side view of the vessel of FIG. 2 looking in the direction of the arrow A.

FIG. 2B is a side view of the vessel of FIG. 2 looking in the direction of the arrow B.

DETAILED DESCRIPTION

With the present invention a system is provided for production of oil and heavier gas fractions on board a vessel, which transports the load under typically 10-150 barg pressure to shore for final stabilization and further refining/export. The lighter gas fractions are continuously separated out on the field, on board the vessel, and are re-injected into the reservoir simultaneously and together with return load received from the receival plant on shore. All loading and unloading is advantageously carried out by displacement, which reduces the power demand and equipment demand on board the vessel. With the present invention also a method with use of the system is provided, and a vessel particularly feasible for working the method.

Figure 1:
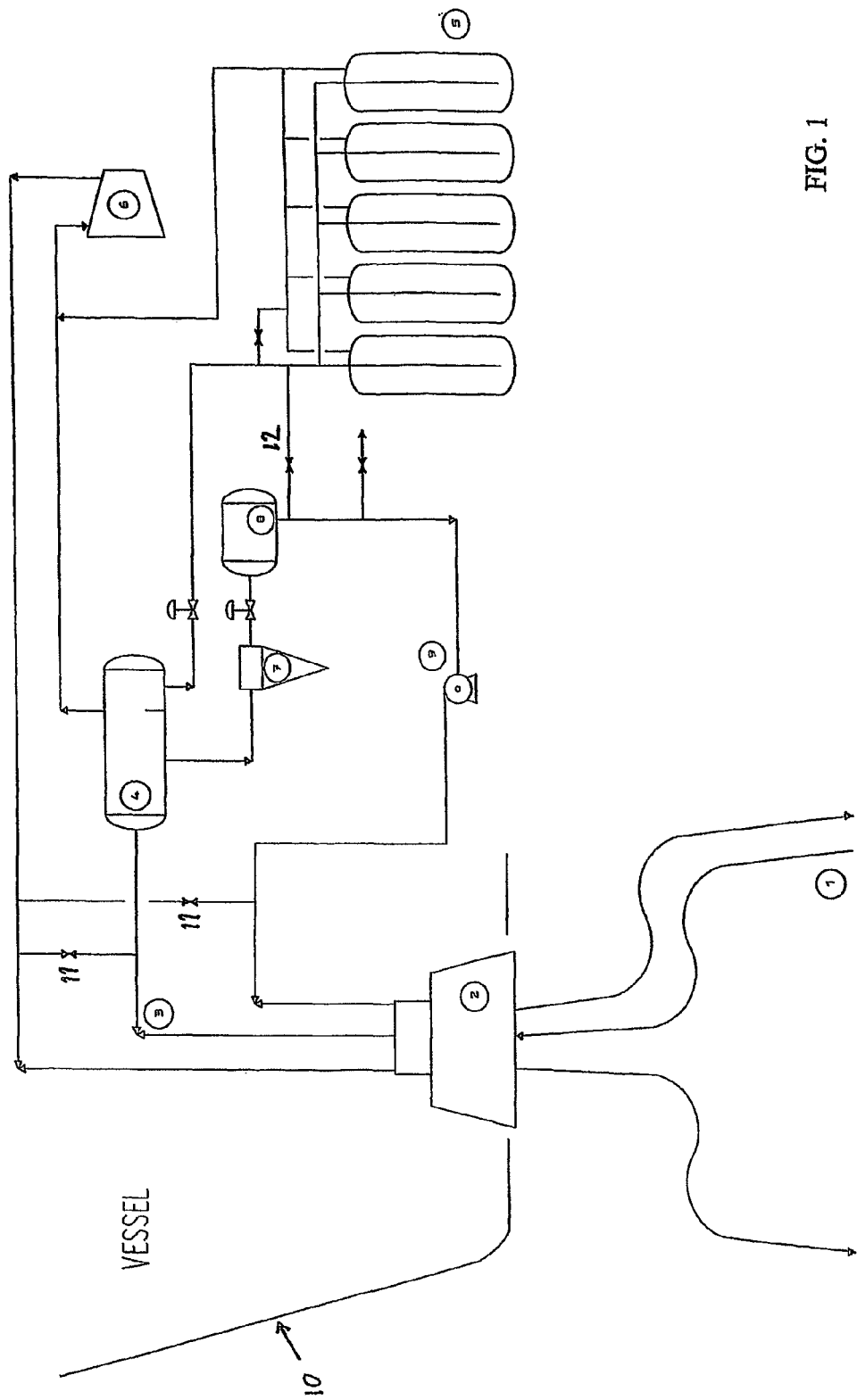
FIG. 1 is a simplified process diagram showing a vessel and a field installation in accordance with the present invention.
Figure 2:
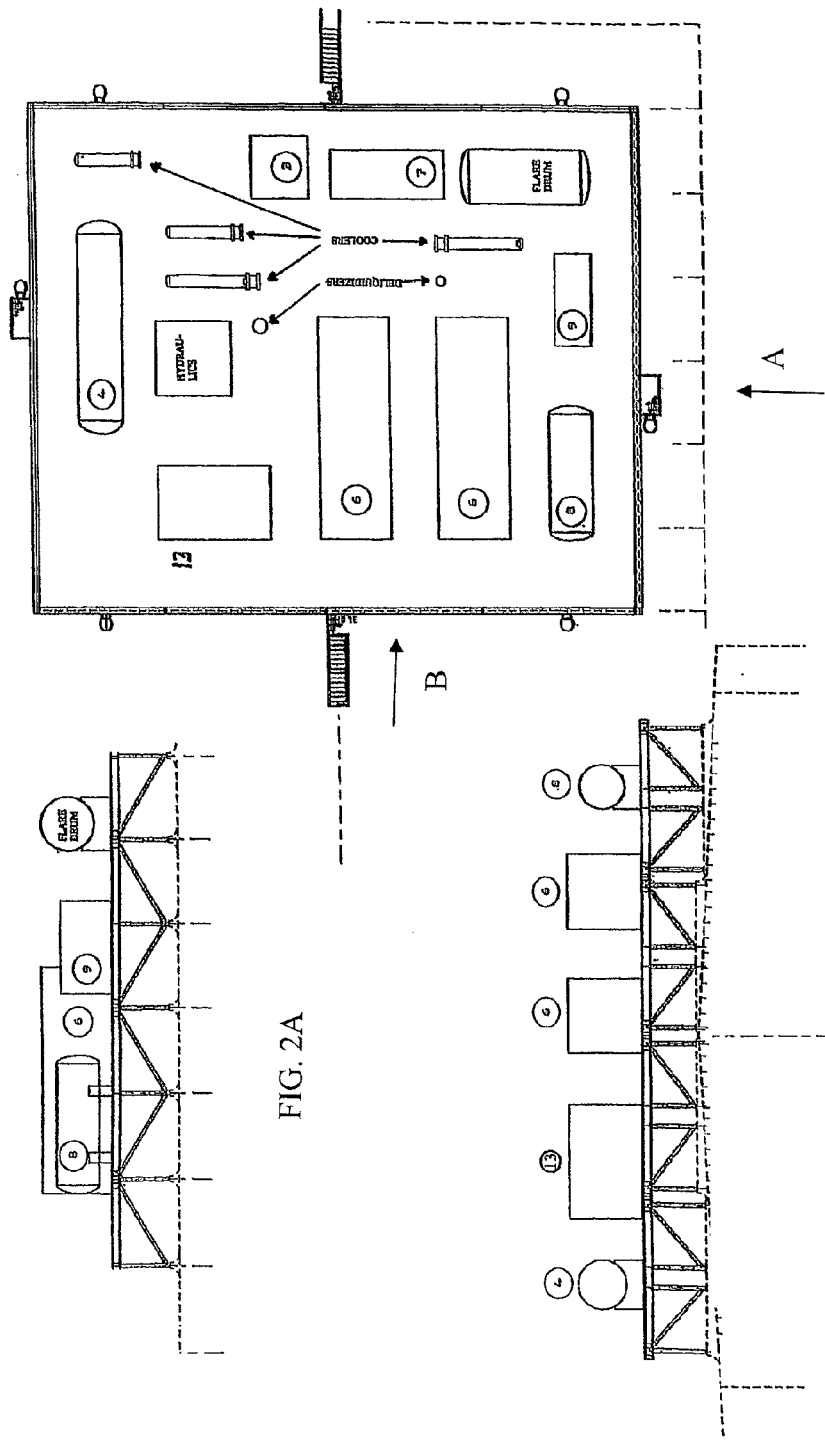
FIG. 2 illustrates a vessel according to the present invention.

Reference is first made to FIG. 1, which is a simplified process diagram for field installations 1, 2 and the vessel 10. The field installation comprises risers 1, connected to production wells and injection wells, respectively, of which at least one well of each type exists. Further, the field installation comprises a loading and unloading station 2, preferably in the form of a STL/STP-buoy (submerged turret loading/submerged turret production), of previously known type. The buoy is connected to the vessel 10 in a downward open intake room in the hull of the vessel. In the vessel a process plant is arranged for separation of the lighter gas fractions from the well stream received via the field installation. The process plant comprises at least one separator 4, in the form of a three-phase separator, at least one injection compressor 6, and equipment for handling separated water. Separated, lighter gas fractions are re-injected into the reservoir by use of the compressor 6. Separated oil and heavier gas fractions are brought to the high-pressure storage tanks 5, in the form of vertically standing, high high-pressure tanks of composite material. Said loading takes place simultaneously with unloading from the storage tanks 5 of high-pressure gas delivered from the receival plant, by use of displacement. By always maintaining a high pressure in the separator 4 and tanks 5, the power demand for the compressor 6 is reduced, while the previously mentioned problems related to pressure relief of the load, are avoided. Separated water from the separator is either directly injected into the reservoir as pressure support by use of an injection pump 9, with or without cleaning in an optional hydrocyclone 7 and an optional degassing tank 8, or is dumped to sea after having been cleaned in hydrocyclones and degassing tank, optionally via slop tanks. It is not obligatory with equipment for both water injection (injection pump 9) and water cleaning (hydro cyclone 7 and degassing tank 8), it is sufficient that one of said categories of equipment is provided. On FIG. 1 both types of equipment are illustrated, in that water cleaning equipment is connected upstream of the injection pump, however, one group of equipment may be omitted or an optional bypass line around the water-cleaning equipment can be arranged. It is, however, advantageous to use a degassing tank under high pressure before water injection, in order to degas injection water, while a separate booster pump is still not required. Above, the equipment that must be provided with a field installation of the system and the vessel according to the present invention to achieve the aimed functionality have been described. Usually, additional equipment will be present to ensure that temperature and pressure are within acceptable limits for the equipment units, the pipe system and the risers. Additional separation steps and additional compression steps may also be present, according to pressure and processing demand for the well stream. The system and the vessel according to the invention preferably have means for so-called "bullheading", which means that the liquid column in the well is pressed down in the well by use of pressurized gas from the compressor 6 of the vessel. When the pressure is relieved, the liquid column is accelerated towards the vessel and the well can start producing. This is achieved by a coupling 11 from the gas injection line to the production well, as illustrated on FIG. 1. Further, the system of the invention is advantageously adapted for gas lift in one or several production wells, which is achieved by a coupling 11 for gas injection to inside the well string, having outlet at a selected level, as indicated on FIG. 1. For gas lift the gas is let out inside the well at a selected level, in that a separate gas lift line is brought down into the well (not illustrated in detail), within or outside the production riser and the production liner in the well, having outlet in the well, through an optional feed-through, at said level. The cross-connection line 12 with valve is used for injection of liquid delivered from storage tanks 5, which liquid can be return liquid from the receival plant. The means for bullheading and gas lift make it economically feasible to produce from wells having lower flowing well pressure than earlier, which means pressure below about 100 bar. FIGS. 2, 2A and 2B provide a further illustration of a vessel 10 according to the invention. The units are disclosed with the same reference numericals as for FIG. 1. The system and vessel according to the invention are preferably arranged so that injection of hydrate inhibitors can take place, for example in the form of methanol injection to prevent hydrate formation in the production and gas injection wells at long-term shutdowns, which is indicated on FIG. 2 in the form of a chemical injection package 13. The injection of inhibitors can either take place by connecting to the well heads at the seabed by use of one or several umbilicals (not illustrated), or by injection in gas stream which is brought down into the wells through the risers. FIG. 2 also illustrates a second stage compressor 6 and additional equipment in the form of liquid separators, coolers, flare drum, chemical injection package 13 (which includes hydrate inhibitor) and choke valves 3, and how said elements can be arrange on deck. High-pressure storage tanks 5 are not specifically illustrated, but they are preferably arranged vertically standing, and are in the form of composite tanks. Thereby the weight is reduced and also the requirement of energy for transport, so that more load can be stored and transported, while a natural separation of the load in each tank is achieved.

Figure 3:
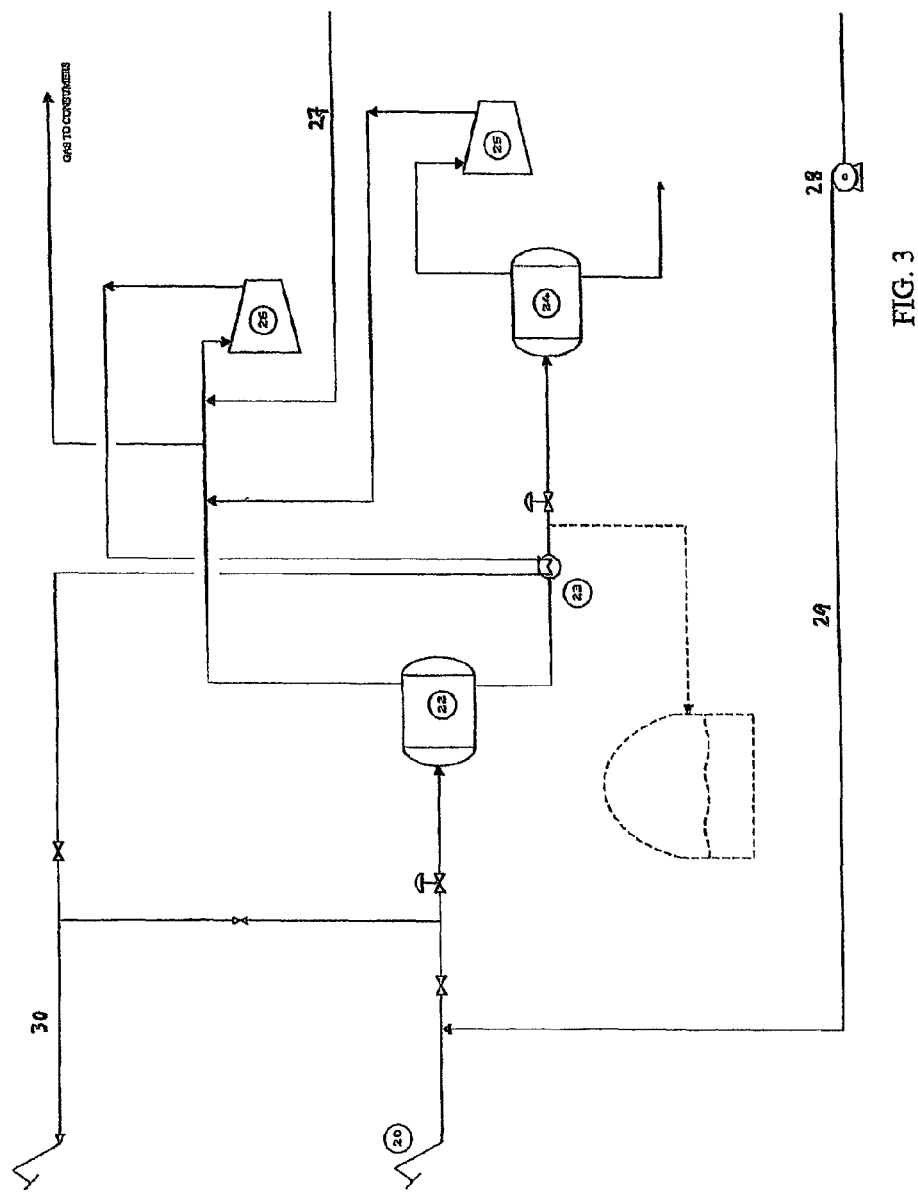
FIG. 3 is a simplified process diagram illustrating a receival plant according to the invention.

FIG. 3 is a simplified process diagram showing a receival plant on shore. The receival plant comprises a high-pressure loading arm 20, for loading of the load from the vessel, plus a high-pressure unloading arm 30 for loading of the tanks of the vessel with return gas under high pressure, by displacement of the load. The receival plant further comprises a first stage stabilization separator 22, a second stage stabilization separator 24 and a booster compressor 25. It is important to notice that an export compressor 26 is connected to the unloading arm for return gas to the vessel, which compressor is used for displacement of the load from the vessel. The gas that is unloaded is provided from a standard process plant by processing of the load, and in addition further gas is supplied according to demand or as desired, illustrated by a line 27 for additional/return gas. It may be desirable to deliver for example $CO_2$ as return gas to the vessel. The gas from the export compressor 26 is cooled as required by heat exchange against oil from a first stabilizing step, in a heat exchanger 23, in order not to exceed the maximum temperature of the tank. The receival plant preferably also comprises a pump 28 in a liquid line 29 connected to the high-pressure loading arm 20. Optionally, a pump with connection (not illustrated) to the unloading arm 30 is provided, for loading of the vessel with high-pressure liquid, by displacement of the load from the vessel.

Advantageously, a part of the separated lighter gas fraction on the vessel can be used for energy production on board.

Further, inert gas is advantageously arranged between the tanks on the vessel, preferably in the form of argon, optionally in the form of $CO_2$ or another inert gas, in order to reduce the risk of fire and to ensure low heat loss from the storage tanks.

Coolers are advantageously arranged on the vessel, upstream storage tanks and compressors, and injection risers, with cooling against seawater or colder process flow. On the vessel advantageously one or several gas tanks are present for storage of gas under higher pressure, in particular for "bullheading" during startup. Advantageously, the vessel has not been equipped with any separate power package on board for operation of the process plant, as the machinery of the vessel itself preferably can be reallocated to meet said demand, optionally by use of a part of the lighter gas fractions. In an embodiment of the system liquidized $CO_2$ originally received from the receival plant is unloaded and injected, either via the injection pump, or after gasification, by use of the compressor, while simultaneous loading of oil and heavier gas fractions take place to the storage tanks. $CO_2$-liquid can be filled into the tanks of the vessel from the receival plant by displacement, with a water plug between $CO_2$-liquid and the load of oil and heavier gas fractions. With $CO_2$-liquid in the storage tanks loading and unloading thereof preferably takes place with a water plug that successively is brought between the tanks.

Potential sand in the well stream is accumulated in the three-phase separator and possibly in the degassing tank if present, as said units are dimensioned to receive and store the sand during a loading/production period. The receival plant includes sufficient equipment for flushing out and cleaning said sand. When the vessel lays connected to the receival plant the separator and optional degassing tank can be cleaned for sand by rinsing with water, as a certain over-pressure of gas in the tanks during flushing will result in that mixture of water and sand is flowing naturally to a sand treatment tank on shore. In the receival plant the sand will be washed with water and perhaps chemicals until it is clean enough to be deposited.

The storage tanks of the vessel are preferably vertically standing composite high-pressure storage tanks, with a diameter of about 3 meters and height of about 30 meters (215 $m^3$/tank, 350 tanks altogether typically). The tanks of the vessel are not exposed to corrosion, as they are made of composite material, and they comprise an internal protective gas-tight barrier, a so-called liner.

The system, the method and the vessel according to the invention can flexibly be use for fields with different or varying GOR (Gas Oil Ratio). Oil of low GOR is stored at up to 50-60 barg pressure, with degassing of lighter fractions during load travel to dedicated gas tanks constructed for higher pressure, typically 150 barg or more. Any combination of gas/liquid can in principle be sent to the storage tanks on the vessel. The tanks are used at a storage pressure down to about 10 barg, maximum about 150 barg, at a temperature of maximum 65° C. The operating pressure is determined by which gas fractions are desirable for mixing with the oil, as low contents of lighter gas fractions entails that lower pressure can be used. The pressure of the well stream is stepwise reduced through the processing equipment units to the storage tanks for oil and heavier gas fractions, as the highest pressure in storage tanks (about 150 barg) is used for wells of high flowing pressure and/or for high GOR, with decreasing storage pressure according to well pressure and GOR, as the highest possible storage pressure on the tanks results in advantageously lower energy consumption for compression and injection. Preferably, the highest possible pressure in the storage tanks on the vessel is used in order to limit the energy consumption and equipment demand. Each tank on the vessel will have a gas coupling and a liquid coupling, both preferably located in the top of the tank with the liquid pipe brought internally down to the bottom, optionally the gas pipe is brought in from the top and the liquid pipe is brought in from the bottom. A vessel will typically include segments or groups of tanks. A manifold system on the vessel makes it simple to adapt the loading for each tank segment, optionally for single tanks, advantageously also successively.

The system is arranged for injection of gas displaced from the storage tanks, and injection of separated lighter gas fractions from the well stream, which means that emissions to air are significantly reduced by avoiding continuous flaring. Before the gas is compressed, it must be cooled and possible condensate must be removed. Gas compressing takes place by use of one, two or several centrifugal compressor steps. Condensate is removed from the gas by use of cooling and subsequent scrubbing in a deliquidiser. Typical suction pressure for a first compressor step will be 25-60 barg, while a second compressor step will have a suction pressure of about 150 barg. However, the compressor pressure is preferably adapted to the capacity requirement by using the operational range of the compressor, which for wells of high flowing well head pressure gives a suction pressure from the inlet separator of typically 150 barg, so that only one compressor is required as a minimum.

Before gas injection the gas is usually cooled down to avoid exceeding the allowable maximum temperature in the gas injection risers. As previously mentioned the injection gas can be used both for gas lifting and for pressurizing of production wells before startup, which means "bullheading" of production wells, by redirecting all or a part of the injection gas. In a preferred embodiment the compressors can also be used for injection of methanol for inhibition of hydrate formation, in which situation the methanol must be heated to above its boiling point of 64.7° C.

The combination with stored gas on tanks, preferably with gas tanks at higher pressure in addition, and gas injection compressors, gives an advantageously large flexibility both at startup and shutdown, and the possibility of producing from wells having lower well pressure than what was previously profitable. Because of loading and unloading by displacement, the vessel has no export pumps (unloading pumps) on board, so that the vessel will be of lower cost and can carry larger load.

If hydrocyclones and degassing tank are used for cleaning of water, before dumping or cleaning in order to extract further hydrocarbons before water injection, the degassing tank will normally be operated at a pressure that is at least 10 bar below the pressure of the upstream separator, to provide enough driving force for the hydrocyclones.

For water injection, for pressure support in the reservoir, by injection of separated, optionally cleaned water, and optionally further liquids received from the receival plant, it will, due to the high delivery pressure from the separator, optionally from the degassing tank and storage tanks, be required with only one injection pump without any further pressurizing pump upstream of the injection pump.

The receival plant, which will be a processing plant onshore, will advantageously be dimensioned to be able to receive load from more than one vessel, which reduces the amount of equipment and personnel offshore. The receival plant generally comprises a stabilization train and an associated recompression train to bring the separated gas back to the vessel, together with potential additional gas and/or liquid. The stabilization train comprises at least two separators with gradually reduced pressure, and heating of the feed flow, preferably by heat exchange against gas from the export compressor coupled to the gas pipe towards the vessel.

In addition to lower demand for energy also low temperatures with associated risk of hydrate formation and freezing of pipes and valves are avoided, by use of loading and unloading by displacement, as previously described. It is however not obligatory to unload the vessel by displacement from the receival plant. During unloading, oil and heavier gas fractions can be brought from the storage tanks to the separation unit on board the vessel via the choke valve, the pressure can thereby be reduced to for example 10 barg so that gas fractions are vaporized. Then the gas can be recompressed by the compressor on board, and used to displace the remaining tank contents by leading the gas to the tanks, so that the oil can be brought to the receival plant via the loading arm of the receival plant.

The invention claimed is:

1. A system for production of oil and heavier gas fraction from a reservoir under the seabed, comprising:
   a field installation with at least one production well and one injection well, said at least one production well and one injection well being connected with risers to a loading and unloading station,
   a vessel configured to be connected to the loading and unloading station,
   a receival plant configured to load and unload the vessel,
   wherein the vessel comprises a high-pressure three-phase separator, an injection compressor, and either water cleaning equipment or water injection equipment, and the receival plant comprises a high-pressure loading and unloading mechanism, so that the vessel as connected to the field installation can load high pressure well fluid that is brought into the high-pressure three-phase separator and separated to lighter gas fractions, oil and heavier gas fractions, and water, of which oil and heavier gas fractions are configured to be brought to high-pressure storage tanks in the vessel, said high-pressured storage tanks containing high-pressure gas that thereby is displaced out of the high-pressure storage tanks and injected into the reservoir together with the lighter gas fractions, via the injection compressor, after which oil and heavier gas fractions after transport to the receival plant are configured to be unloaded by displacing the tank contents with high-pressure gas delivered from the receival plant.

2. The system according to claim 1, wherein the vessel and the field installation comprise equipment for "bullheading".

3. The system according to claim 1, wherein the vessel and the field installation comprise equipment for gas lift.

4. The system according to claim 1, wherein the vessel and the field installation comprise equipment for hydrate inhibition.

5. The system according to claim 1, wherein the vessel includes storage tanks in the form of vertically standing high-pressure composite tanks, typically of a diameter of 3 meters and a height of 30 meters, each having a volume of 215 m$^3$, typically a total of 350 tanks.

6. The system according to claim 1, wherein the vessel includes an injection pump for water/liquid.

7. The system according to claim 1, wherein the vessel includes water cleaning equipment in the form of one or several hydrocyclones and at least one degassing tank.

8. The system according to claim 1, wherein a part of the lighter gas fraction separated on the vessel is used for energy production on board.

9. The system according to claim 1, wherein inert gas is arranged between the tanks on the vessel.

10. The system according to claim 1, wherein coolers are arranged on the vessel, upstream storage tanks and compressors, and upstream injection risers.

11. The system according to claim 1, wherein the vessel includes one or more gas tanks for storage of gas under high pressure.

12. The system according to claim 1, wherein the vessel is without a separate power package for operation of the process plant, in that the machinery of the vessel can be reallocated to said operation, optionally by support of energy production from a part of the separated lighter gas fractions.

13. The system according to claim 1, wherein it is adapted to be able to receive liquid $CO_2$ from the receival plant for injection into injection well, as the injection pump can handle liquid $CO_2$ delivered through pipe from the storage tanks of the vessel.

14. The system according to claim 1, wherein possible sand in the well stream is accumulated in the three-phase separator and in an optional degassing tank, during one production/loading period, with subsequent unloading of sand and cleaning thereof at the receival plant.

15. The system according to claim 1, wherein the receival plant comprises a stabilization train with an associated recompression train.

16. The system according to claim 15, wherein separated gas is brought as high-pressure gas back to the vessel, optionally together with additional gas and/or liquid under high pressure.

17. The system according to claim 1, wherein the receival plant comprises a high-pressure loading arm and a high-pressure unloading arm.

18. The system according to claim 1, wherein the vessel is without unloading pumps (export pumps).

19. The system according to claim 1, wherein by loading $CO_2$-liquid from the receival plant by displacement, with water between $CO_2$-liquid and oil/heavier gas fractions load, as lines, valves and manifolds are adapted for successive loading and unloading of storage tanks.

20. The system according to claim 1, wherein storage tanks on board the vessel are dimensioned for 150 barg pressure at 65° C., with degassing of lighter gas fractions during load travel to dedicated gas tanks constructed for higher pressure.

21. A method for production of oil and heavier gas fractions from a reservoir under the seabed, by use of the system according to claim 1, wherein lighter gas fractions from the production well are separated on board the vessel and injected into the reservoir through at least one injection well together with return gas from the storage tanks, wherein said return gas has been loaded and transported from the receival plant, by means of the oil and heavier gas fractions delivered from the separator displacing the return gas in the storage tanks of the vessel, while the return gas and the lighter gas fractions are compressed and injected into the injection well, and at the receival plant oil and heavier gas fractions are unloaded from the storage tanks of the vessel by displacement, by use of high-pressure return gas delivered from the receival plant.

22. The method according to claim 21, wherein a part of the injection gas is used for gas lift.

23. The method according to claim 21, wherein the injection compressor is used for "bullheading".

24. The method according to claim 21, wherein the vessel at the receival plant is loaded with return load in form of a liquid, which liquid in the storage tanks at the field installation is displaced by oil and heavier gas fractions while the liquid is injected into the reservoir via an injection pump on the vessel, optionally together with separated water delivered from the separator.

25. The method according to claim 21, wherein the return load is a liquid under high pressure, preferably $CO_2$-liquid, which is injected into the reservoir by being brought from the storage tanks to an injection pump on the vessel as connected to the field installation, by successive loading of the storage tanks with a water plug between $CO_2$-liquid and oil with heavier gas fractions, and with correspondingly successive unloading of oil and heavier gas fractions at the receival plant while $CO_2$-liquid is loaded as return load.

26. The method according to claim 21, wherein the pressure of the storage tanks, lines and equipment units are kept as high as possible during all loading, unloading and transport, to minimize the requirement of energy for loading and unloading for production of oil and heavier gas fraction from a reservoir under the seabed.

27. A vessel for production of oil and heavier gas fraction from a reservoir under the seabed, said vessel being connected to a loading and injection station offshore and to a receival plant onshore, respectively, for loading and unloading the vessel, said vessel comprising a high-pressure three-phase separator, an injection compressor, and either water cleaning equipment or water injection equipment, high-pressure storage tanks and a loading and unloading equipment dimensioned for high pressure, wherein the vessel as connected to the loading and injection station offshore can load high-pressure well fluid that is brought into the high-pressure three-phase separator and separated to lighter gas fractions, oil and heavier gas fractions, and water, of which oil and heavier gas fractions are configured to be brought to the high-pressure storage tanks in the vessel, wherein the high-pressure storage tanks contain high-pressure gas that thereby is displaced out of the high-pressure storage tanks and injected into the reservoir together with the lighter gas fractions, via the injection compressor, after which oil and heavier gas fractions after transport to the receival plant are configured to be unloaded by the tank contents being displaced by high-pressure gas delivered from the receival plant.

28. The vessel according to claim 27, wherein the vessel includes equipment for "bullheading", as the compressor can be connected to production wells.

29. The vessel according to claim 27, wherein the vessel includes equipment for gas lift, as the compressor can be connected to a line for gas lift on the loading and injection station offshore.

30. The vessel according to claim 27, wherein the vessel includes equipment for hydrate inhibition, as the vessel includes a methanol tank, a methanol injection pump and equipment for connection thereof to production and injection wells offshore, at the loading and injection station.

31. The vessel according to claim 27, wherein the vessel includes storage tanks in the form of vertically standing high-pressure composite tanks, typically with a diameter 3 m and height of 30 m, each tank with a volume of 215 m$^3$, typically a total of 350 tanks.

32. The vessel according to claim 27, wherein the vessel includes an injection pump for injection of water separated out from the well stream and injection of liquid contained in the storage tanks as return load from the receival plant, as liquid return load in the storage tanks during loading of the storage tanks with oil and heavier gas fractions under high pressure is displaced through a pipe to the injection pump and water from the separator is delivered through a line to the injection pump.

33. The vessel according to claim 27, wherein the vessel includes cleaning equipment in the form of one or several hydrocyclones and at least one degassing tank.

\* \* \* \* \*